(12) United States Patent
Wang et al.

(10) Patent No.: US 6,415,774 B1
(45) Date of Patent: Jul. 9, 2002

(54) INTAKE AIR PREHEATER FOR A DIESEL ENGINE

(75) Inventors: Kefu Wang; Yiqun Liu, both of Beijing (CN)

(73) Assignees: Tsinghua University; Beijing Firstar New Technology Development Co., both of Beijing (CN)

( * ) Notice: Subject to any disclaimer, the term of this patent is extended or adjusted under 35 U.S.C. 154(b) by 0 days.

(21) Appl. No.: 09/803,294

(22) Filed: Mar. 9, 2001

(30) Foreign Application Priority Data

Mar. 10, 2000 (CN) ...................... 00 1 02923 A

(51) Int. Cl.[7] ............................................. F02M 31/00
(52) U.S. Cl. ........................................ 123/556; 123/549
(58) Field of Search ................................ 123/556, 549, 123/542

(56) References Cited

U.S. PATENT DOCUMENTS 4,112,896 A * 9/1978 Akado et al. ............... 123/556
4,279,234 A * 7/1981 Marcoux et al. ............ 123/549
6,314,949 B1 * 11/2001 Degrazia, Jr. et al. ...... 123/542

* cited by examiner

Primary Examiner—Marguerite McMahon
(74) Attorney, Agent, or Firm—Ratner & Prestia

(57) ABSTRACT

An intake air preheater for a diesel engine comprising an outer housing, at least two built-up heating bodies 26, at least three heat storage exchangers 25, a valve plate 31 and an insulating housing 36. A preheater body 20 is formed by alternately connecting each heat storage exchanger 25 and each built-up heating body 26 together by rivets 33 and a straight air passage 22 is formed in the preheater body 20. The preheater body 20 is installed in the outer housing by attaching two outermost heat exchange plates 39 of the preheater body 20 to two adiabatic rings 24 on the inner wall of the outer housing and a surrounding air passage 29 is formed between the outer housing and the preheater body 20. A diesel engine may start at temperatures as low as −45° C. by means of the preheater and airflow has no adverse effect on the operation of the diesel engine. The poisonous waste gas generated by the diesel engine may also be reduced.

9 Claims, 2 Drawing Sheets

INTAKE AIR PREHEATER FOR A DIESEL ENGINE

TECHNICAL FIELD OF THE INVENTION

This invention relates to an intake air preheater for a diesel engine, particularly to an intake air preheater for a diesel engine with a heat storage exchanger and a built-up heating body, which facilitates the diesel engine to start at low temperature.

BACKGROUND OF THE INVENTION

Chinese Utility Model 93212913.7 disclosed a conventional intake air preheater for a diesel engine. FIG. 1 shows a sectional view of the conventional intake air preheater. The reference numerals in FIG. 1 represent the following elements:

1—a heating chamber;
2—an exchanger fixing bolt;
3—an outer housing;
4—a first stage sensitive to heat ceramics heater;
5—a first stage heat exchange plate;
6—a central baffle plate;
7—a second stage sensitive to heat ceramics heater;
8—a second stage heat exchange plate;
9—an adiabatic ring;
10—a heating chamber;
11—a heat conducting bar;
12—a sensor terminal;
13—a power supply terminal; and
14—a temperature sensor The preheater is installed between an air filter and an intake air manifold of a diesel engine. There is provided in a preheater twelve heat conducting bars evenly spaced from each other along the periphery of the preheater.

When the power supply is turned on, the first and second stage sensitive to heat ceramics heaters 4,7 generate heat to a rated temperature and transmit heat to the first and second stage heat exchange plates 5, 8. When the first and second stage heat exchange plates 5, 8 are heated to the rated temperature, a controller gives off a sound and/or light signal after receiving the signal from the temperature sensor 14. The sound and/or light signal means that the diesel engine may start.

The heating process is as follows. The air enters the heat chamber 1 from the air filter. The air then flows through and is heated by the first stage sensitive to heat ceramics heater 4 under the guidance of the adiabatic ring 9 and the central baffle plate 6. Next, the hot air is further heated by the second stage sensitive to heat ceramics heater 7 and flows into the heating chamber 10. Finally, the heated air flows into the diesel engine from heating chamber 10. The test shows that a diesel engine may start at a low temperature to −30° C. by means of such a preheater.

However, such conventional preheater has the following disadvantages:

1) Because the diesel engine starts as soon as the air in the preheater is heated to the rated temperature, a smaller amount of heat is initially generated, the temperature in the preheater is low and the sustaining-heating ability is poor.
2) The preheater is unable to store heat because of its light weight. The efficiency of heat exchange is also low because the heat exchange plate is provided with small surface area.
3) Although the baffle plate between the heating chamber 1 and heating chamber 10 facilitates to heat the air in the two chambers during the preheating, it will unfavorably prevent the air from entering the diesel engine in the normal operating state, thereby reducing the efficiency of the diesel engine and increasing oil consumption.

SUMMARY OF THE INVENTION

An object of this invention is to provide an intake air preheater for a diesel engine which overcomes the problems described above in the prior art.

In accordance with the present invention, there is provided an intake air preheater for a diesel engine comprising an outer housing comprising a first housing with an air discharge port and a second housing with an air intake port; a preheater body comprising at least two built-up heating bodies and at least three heat storage exchangers, a straight air passage formed in the preheater body, the preheater body installed in the outer housing so that a surrounding air passage is formed between the outer housing and the preheater body; wherein a valve plate is pivotably provided in the straight air passage to open or close the straight air passage.

BRIEF DESCRIPTION OF THE DRAWINGS

For a better understanding of the present invention, reference may be made to the accompanying drawings, in which.

DETAILED DESCRIPTION OF THE PREFERRED EMBODIMENT

Figure 1:
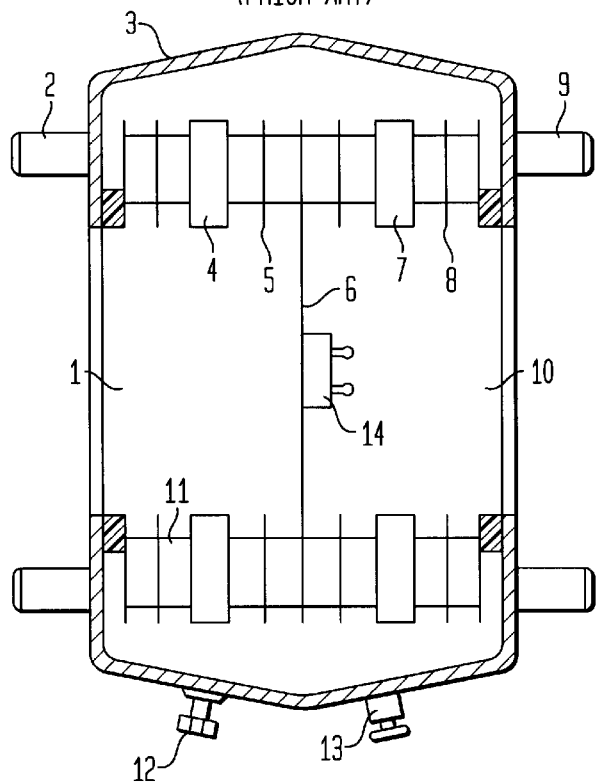
FIG. 1 is a sectional view of a conventional preheater.
Figure 2:
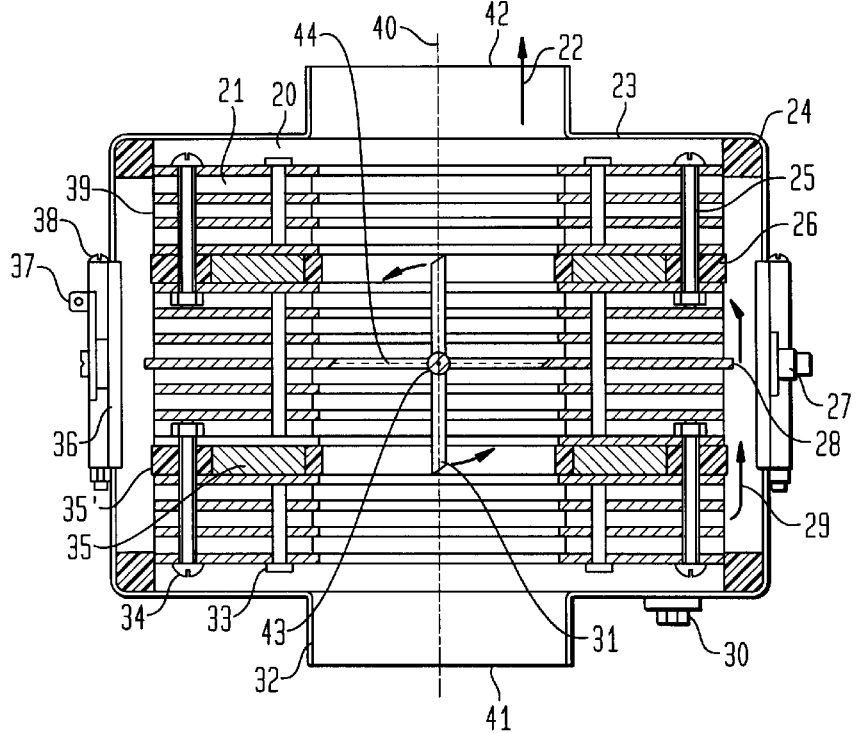
FIG. 2 is a sectional view of a preheater accord in to the present invention.
Figure 3:
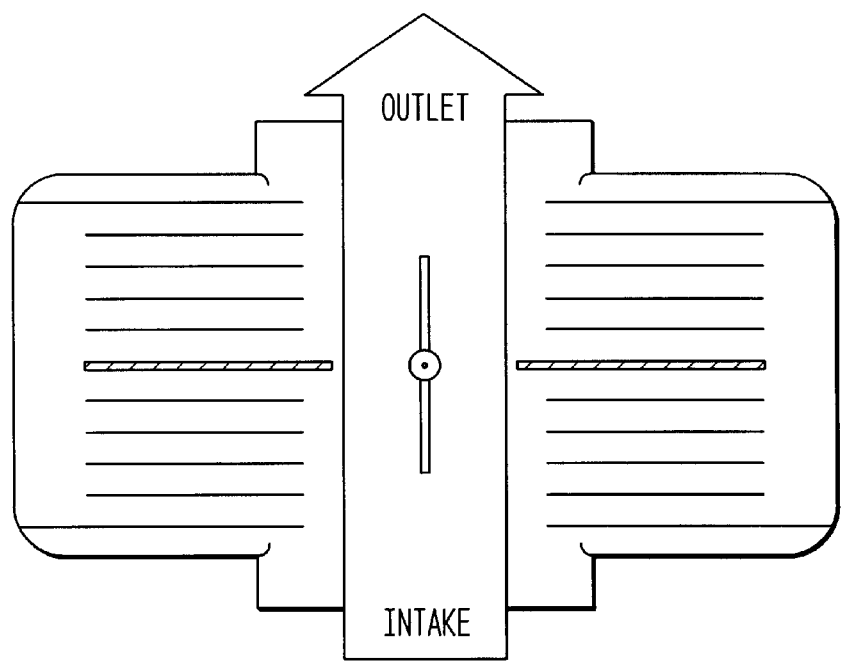
FIG. 3 is a schematic view showing the flow of air in the preheater when a valve plate is in open position.
Figure 4:
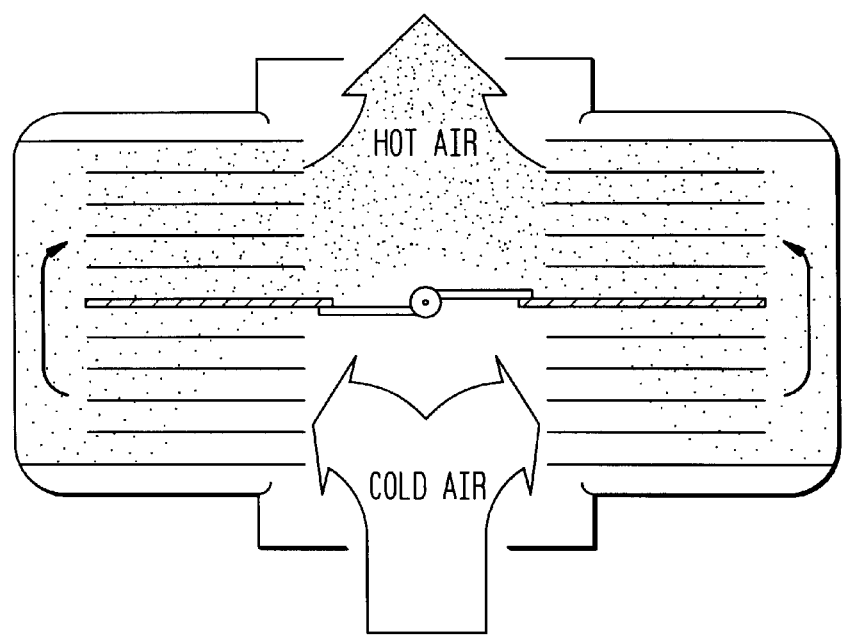
FIG. 4 is a schematic view showing the flow of air in the preheater when a valve plate is in closed position.

The preferred embodiment of the present invention and its advantages are best understood by referring to FIGS. 2–4. The reference numerals in FIGS. 2–4 represent the following elements:

20—a preheater body;
21—a spacer;
22—a straight air passage;
23—a first housing;
24—an adiabatic ring;
25—a heat storage exchanger,
26—a built-up heating body;
27—a power supply terminal;
28—a central baffle plate;
29—a surrounding air passage;
30—a ground terminal;
31—a valve plate;
32—a second housing;
33—a rivet;
34—an assembly bolt;
35—a heating element;
35'—an insulative and adiabatic material;
36—an insulating housing;

37—a handle;
38—a housing fixing bolt;
39—a heat exchange plate;
40—a central axis of the housing;
41—an intake air port;
42—a discharge air port;
43—a shaft; and
44—a central opening Now referring to FIG. 2, there is provided an intake air preheater for a diesel engine comprising an outer housing and a preheater body 20. The outer housing consists of a first housing 23 with an air discharge port 42, a second housing 32 with an air intake port 41, and an insulating housing 36 between the housings 23 and 24, which are fixedly assembled by bolts 38. The preheater body 20 consists of at least two built-up heating bodies 26 and at least three heat storage exchangers 25. Each of built-up heating bodies 26 comprises a heating element 35 and an insulative and adiabatic material 35' sandwiching the heating element 35. Each of heat storage exchangers 25 consists of several heat exchange plates 39 with central openings and many spacers 21. The heat exchange plates 39 have big mass and large surface area. Preferably, the heat storage exchangers are made of aluminum and have a gross mass of at least 300 g and a total surface area of at least 1,000 $cm^2$. The many triangular spacers 21 are laminated between two adjacent heat exchange plates 39 and an interspace is retained between two adjacent spacers 21. Each heat storage exchanger 25 is attached to the built-up heating bodies 26 by the assembly bolts 34 so that the preheater body 20 is formed by alternately connecting each heat storage exchanger 25 and each built-up heating body 26 together by rivets 33. A straight air passage 22 is thus formed in the preheater body 20. A valve plate 31 is provided in a central opening 44 of a central baffle plate 28 between the two built-up heating bodies 26, which may pivot around a shaft 43 to open or close the straight air passage 22. The preheater body 20 is installed in the outer housing by attaching two outermost heat exchange plates 39 of the preheater body 20 to two adiabatic rings 24 on the inner wall of the outer housing so that a surrounding air passage 29 is formed between the outer housing and the preheater body 20. The insulating housing 36 is provided with a power supply terminal 27 and a handle 37 for controlling the valve plate 31.

Next, the operating of the intake air preheater for the diesel engine will be described.

First, the preheater is installed between air filter and an intake air manifold of a diesel engine through an adapter. The valve plate 31 may pivot around the shaft 43 by manipulating the handle 37 to open or close the central opening 44.

The power is supplied to the built-up heating bodies 26 through the power supply terminal 27 and the ground terminal 30 when the preheating begins. The built-up heating bodies 26 generate heat and further transmit heat to the heat storage exchangers 25 which in turn heat the air in the preheater.

A preheating time is defined as the time required to heat the air to the rated temperature and maintain the rated temperature constant.

When the preheating ends, the heat storage exchanges 25 store a large amount of heat and some air in the ducts at the end of the preheater is also heated because heat exchange plates 39 have big mass and large surface area. This is very different from the conventional process in which little heat may be stored in the preheater.

Next, the valve plate 31 pivots around the shaft 43 by manipulating the handle 37 to close the central opening 44 of the central baffle plate 28.

The diesel engine then starts and the cool air is forced into the preheater through the air filter. Because the valve plate 31 closes the central opening 44 of the central baffle plate 28, the air then flows through the heat storage exchanger 25 and the surrounding air passage 29, thereby exchanging heat with the heat storage exchanger 25, as shown in FIG. 4. The preheated air flows into the diesel engine. This ensures that the diesel engine may start easily.

After the diesel engine runs in normal operating state with the aid of the preheated air, the valve plate 31 pivots around the shaft 43 by manipulating the handle 37 to open the central opening 11 of the central baffle plate 28. The cool air flows through the straight air passage 22 and into the diesel engine, as shown in FIG. 3.

The preheater according to the present invention has the following advantages:

1) In the preheater according to the present invention, by use of the heat storage exchanger with big mass and large surface area, a part of heat generated by the built-up heating bodies during the preheating may be stored in the heat storage exchanger and the remainder of heat may be used to heat the air in the surrounding air passage and the preheater body. As a result, the temperature of the air discharged from the discharge port of the present preheater is higher than that of the air discharged from the discharge port of the conventional preheater by 80° C. and the time for sustaining-preheating according to the present preheater is as 30 times long as that of the conventional preheater. A diesel engine may start at a lower temperature to −45° C. in this way.

2) The valve plate closes the central opening of the central baffle plate during the preheating so that the air flows through the heat storage exchanger and the surrounding air passage. The valve plate opens the central opening when the diesel engine is in the normal operating state so that the air may go through the straight air passage and into the diesel engine. Flowing of the air in this way has no adverse effect on the operation of the diesel engine.

3) Several heating elements of the built-up heating bodies generate simultaneously and independently heat and each heating element is insulated by the insulative and adiabatic material, thereby improving the operating reliability of the preheater.

4) Since the stored heat preheats the air through the preheater when the diesel engine starts, the fuel in the diesel engine may fully burn with little poisonous waste gas giving off.

Although the present invention and its advantages have been described in detail, it should be understood that various changes, substitutions and alterations can be made therein without departing from the spirit and scope of the invention as defined by the appended claims. For example, the straight air passage 22 may be in cylindrical shape or any other suitable shape. The heat exchange plates 39 may be in ring-shaped or any other suitable shape. The spacers 21 may be triangular or in any other suitable shape.

What is claimed:

1. An intake air preheater for a diesel engine, comprising:
   an outer housing comprising a first housing with an air discharge port and a second housing with an air intake port;

a preheater body comprising at least two built-up heating bodies and at least three heat storage exchangers, a straight air passage formed in the preheater body, said preheater body installed in the outer housing so that a surrounding air passage is formed between the outer housing and the preheater body;

wherein, a valve plate is pivotably provided in said straight air passage to open or close said straight air passage.

2. An intake air preheater set forth in claim 1 wherein a central baffle plate is provided between two built-up heating bodies and said valve plate is pivotably mounted in a central opening of said central baffle plate.

3. An intake air preheater set forth in claim 1 wherein said outer housing further comprises an insulating housing) between said first housing and second housing on which a power supply terminal and a handle for controlling the valve plate are provided.

4. An intake air preheater set forth in claim 1 wherein each of said built-up heating bodies comprises a heating element and an insulative and adiabatic material sandwiching the heating element.

5. An intake air preheater set forth in claim 1 wherein each of said heat storage exchangers comprises several heat exchange plates with central openings and a plurality of spacers, said spacers are laminated between two adjacent heat exchange plates and an interspace is retained between two adjacent spacers, and said heat storage exchangers are made of aluminum and have a gross mass of at least 300 g and a total surface area of at least 1,000 $cm^2$.

6. An intake air preheater set forth in claim 1 wherein said preheater body is formed by alternately connecting each heat storage exchanger and each built-up heating body together.

7. An intake air preheater set forth in claim 5 wherein said preheater body is installed in the other housing by attaching two outermost heat exchange plates of the preheater body to two adiabatic rings on the inner wall of the outer housing.

8. An intake air preheater set forth in claim 1 wherein said heat exchange plates are in ring-shape.

9. An intake air preheater set forth in claim 1 wherein said spacers are triangular.

* * * * *

UNITED STATES PATENT AND TRADEMARK OFFICE
CERTIFICATE OF CORRECTION

PATENT NO. : 6,415,774 B1
DATED : July 9, 2002
INVENTOR(S) : Kefu Wang et al.

It is certified that error appears in the above-identified patent and that said Letters Patent is hereby corrected as shown below:

<u>Title page,</u>
Item [56], References Cited, insert: -- FOREIGN PATENT DOCUMENTS
CN     93212913.7     4/1994 --

Signed and Sealed this

Twenty-sixth Day of November, 2002

*Attest:*

*Attesting Officer*

JAMES E. ROGAN
*Director of the United States Patent and Trademark Office*